(12) United States Patent  (10) Patent No.: US 8,532,917 B2
Chu et al.  (45) Date of Patent: Sep. 10, 2013

(54) METHOD, SYSTEM, AND RECORDING MEDIUM FOR NAVIGATING VEHICLE

(75) Inventors: Yen-Lee Chu, Taoyuan County (TW); Chun-Hsiang Huang, Taoyuan County (TW)

(73) Assignee: HTC Corporation, Taoyuan County (TW)

( * ) Notice: Subject to any disclaimer, the term of this patent is extended or adjusted under 35 U.S.C. 154(b) by 362 days.

(21) Appl. No.: 12/888,428

(22) Filed: Sep. 23, 2010

(65) Prior Publication Data

US 2011/0071753 A1 Mar. 24, 2011

(30) Foreign Application Priority Data

Sep. 23, 2009 (TW) .............................. 98132113 A

(51) Int. Cl.
*G01C 21/00* (2006.01)

(52) U.S. Cl.
USPC .......................................................... 701/400

(58) Field of Classification Search
USPC ................. 701/400, 408, 409, 410, 412, 414, 701/415, 416, 421, 423, 430, 431
See application file for complete search history.

(56) References Cited

U.S. PATENT DOCUMENTS

| | | | |
|---|---|---|---|
| 2007/0124072 A1* | 5/2007 | Nakayama et al. | 701/211 |
| 2007/0225902 A1 | 9/2007 | Gretton et al. | |

FOREIGN PATENT DOCUMENTS

| | | | |
|---|---|---|---|
| CN | 101239626 | | 8/2008 |
| CN | 101339043 | | 1/2009 |
| DE | 10327869 | | 1/2005 |
| EP | 1793204 | | 6/2007 |
| EP | 2012088 | | 1/2009 |
| JP | 2007-178358 | * | 7/2007 |
| TW | 200827671 | | 7/2008 |
| TW | 200827673 | | 7/2008 |

OTHER PUBLICATIONS

"Search Report of European Counterpart Application", issued on May 5, 2011, p. 1-p. 3.
"First Office Action of European Counterpart Application", issued on May 18, 2011, p. 1-p. 5.
"Second Office Action of China Counterpart Application", issued on Aug. 3, 2012, p. 1-p. 12.
"First Office Action of China Counterpart Application", issued on Dec. 12, 2011, p. 1-p. 5.
"Office Action of Taiwan Counterpart Application", issued on Nov. 20, 2012, p. 1-p. 6.
"Second Office Action of European Counterpart Application", issued on Jun. 25, 2012, p. 1-p. 6.

* cited by examiner

*Primary Examiner* — Kim T Nguyen
(74) *Attorney, Agent, or Firm* — Jianq Chyun IP Office

(57) ABSTRACT

A method, a system, and a recording medium for navigating a vehicle are provided. In the present application, a current driving lane of the vehicle is first detected through a lane detection technique. Then, whether the current driving lane conforms to a navigation lane in navigation information is determined. If the current driving lane does not conform to the navigation lane, a notification of direction of the navigation lane relative to the current driving lane is generated. Accordingly, a driver can be instantly notified to switch to the appropriate lane.

19 Claims, 3 Drawing Sheets

METHOD, SYSTEM, AND RECORDING MEDIUM FOR NAVIGATING VEHICLE

CROSS-REFERENCE TO RELATED APPLICATION

This application claims the priority benefit of Taiwan application serial No. 98132113, filed on Sep. 23, 2009. The entirety of the above-mentioned patent application is hereby incorporated by reference herein and made a part of this specification.

BACKGROUND

Motor vehicle has become one of the most important applications in modern development along with the advancement of technologies. However, the road systems have grown very complicated due to the rapid expansion of the cities. Thus, different navigation systems (for example, the global positioning system (GPS) and the traffic message channel (TMC)) have been invented and brought us a lot of conveniences. An existing in-car navigation device not only provides guidance on roads and sites but also allows a driver to understand the current driving status and the position, direction, and speed of the vehicle.

Generally speaking, a driver driving in a highway usually follows the guidance of a GPS navigator, and the GPS navigator gives a sound to notify the driver when the vehicle is about to reach an access road. For example, when the vehicle is about to reach the destination, the GPS navigator instructs the driver to turn left or right. However, the driver may still miss the destination if the driver does not realize that the current driving lane is not a turn lane.

Additionally, a navigation system usually cannot get to know the road condition of a current driving lane or whether the current driving lane is open. Thus, the driver has to pay attention on the road condition ahead in the current driving lane. The driver may be fined if the driver accidentally enters an unallowable lane (for example, a bus lane or a lane open to the opposite direction in rush hours). Moreover, the safety of the driver may be jeopardized if an accident occurs or a construction is going on ahead in the current driving lane.

SUMMARY OF THE APPLICATION

Accordingly, the present application is directed to a vehicle navigation method, wherein a driver is generated to switch to a navigation lane when it is detected that a current driving lane does not conform to the navigation lane.

The present application is directed to a vehicle navigation system, wherein a current driving lane of a vehicle is analyzed and captured through a lane detection technique so that the vehicle can be navigated and a driver can be notified ahead to switch lanes.

The present application provides a vehicle navigation method adaptable to an electronic device. A current driving lane of a vehicle is detected through a lane detection technique. Then, whether the current driving lane conforms to a navigation lane in navigation information is determined. If it is determined that the current driving lane does not conform to the navigation lane, a notification for the direction of the navigation lane relative to the current driving lane is generated.

According to an example of the present application, in the vehicle navigation method, whether the current driving lane conforms to a drivable lane recorded in road information is further determined. If it is determined that the current driving lane does not conform to the drivable lane, a notification of the direction of the drivable lane relative to the current driving lane is generated. The road information may be a traffic regulation or a real-time road condition obtained through a traffic message channel (TMC). Besides, whether the current driving lane conforms to an undrivable lane recorded in the road information may further be determined, wherein if it is determined that the current driving lane conforms to the undrivable lane, a notification is generated to switch lanes.

According to an example of the present application, in the vehicle navigation method, the vehicle is further positioned by using a positioning system so as to obtain a position of the vehicle, and a route is further planned as the navigation information. Additionally, in the vehicle navigation method, whether the vehicle is about to reach a destination road section is detected by using the positioning system, so as to determine whether the current driving lane conforms to the navigation lane when the vehicle reaches the destination road section.

According to an example of the present application, before determining whether the current driving lane conforms to the navigation lane, the vehicle navigation method further includes planning a route as the navigation information.

According to an example of the present application, before detecting the current driving lane of the vehicle, a lane info image is captured, so as to detect the current driving lane according to the lane info image through the lane detection technique that is based on image recognition. Besides, a visual indicator (for example, a turn arrow) pointing to the navigation lane may be displayed in the lane info image. In addition, a current driving direction of the vehicle may also be displayed in the lane info image.

The present application provides a vehicle navigation system comprising a lane detection module, a navigation module, a calculation unit, and a notification module. The lane detection module detects a current driving lane of a vehicle through a lane detection technique. The navigation module provides navigation information. The calculation unit determines whether the current driving lane conforms to a navigation lane in the navigation information. If the calculation unit determines that the current driving lane does not conform to the navigation lane, the indication module generates an indication for the direction of the navigation lane relative to the current driving lane.

According to an example of the present application, the calculation unit further determines whether the current driving lane conforms to a drivable lane recorded in road information, and if the calculation unit determines that the current driving lane does not conform to the drivable lane, it notifies the notification module to generate a notification of the direction of the drivable lane relative to the current driving lane, wherein the road information includes a traffic regulation, a real-time road condition, or a combination thereof.

According to an example of the present application, the vehicle navigation system further includes a radio data system module and an image capturing unit. The radio data system module obtains the real-time road condition through a TMC. The image capturing unit captures a lane info image such that the lane detection module can detect the current driving lane according to the lane info image through the lane detection technique that is based on image recognition.

According to an example of the present application, the navigation module further plans a route as the navigation information, and which includes a positioning system for positioning the vehicle. In addition, the navigation module further determines whether the vehicle is about to reach a destination road section and notifies the calculation unit to determine whether the current driving lane conforms to the navigation lane when the vehicle reaches the destination road section.

According to an example of the present application, the notification module further displays a visual indicator (for example, a turn arrow) pointing to the navigation lane in the lane info image. In addition, the notification module may also display a current driving direction of the vehicle in the lane info image.

The present application provides a recording medium, wherein a computer program is loaded into an electronic device and executed by the same to accomplish following steps. First, a current driving lane of a vehicle is detected through a lane detection technique. Then, whether the current driving lane conforms to a navigation lane in the navigation information is determined. If it is determined that the current driving lane does not conform to the navigation lane, a notification for the direction of the navigation lane relative to the current driving lane is generated.

As described above, in the present application, a current driving lane of a vehicle is detected and analyzed through a lane detection technique, and a driver is notified ahead to switch to the correct lane through a vehicle navigation system according to a real-time road condition and a traffic regulation.

BRIEF DESCRIPTION OF THE DRAWINGS

The accompanying drawings are included to provide a further understanding of the application, and are incorporated in and constitute a part of this specification. The drawings illustrate examples of the application and, together with the description, serve to explain the principles of the application.

DETAILED DESCRIPTIONS

Reference will now be made in detail to the present examples of the application, examples of which are illustrated in the accompanying drawings.

A general navigation system can only notify a driver of an appropriate lane according to navigation information but cannot notify the driver (for example, to switch lanes) according to the current driving lane of the vehicle. Thereby, the present application provides a method, a system, and a recording medium for navigating a vehicle through a lane detection technique, wherein an appropriate lane is clearly generated according to a current driving lane of the vehicle and navigation information.

Below, examples of the present application will be described in detail with reference to accompanying drawings.

First Example

Figure 1:
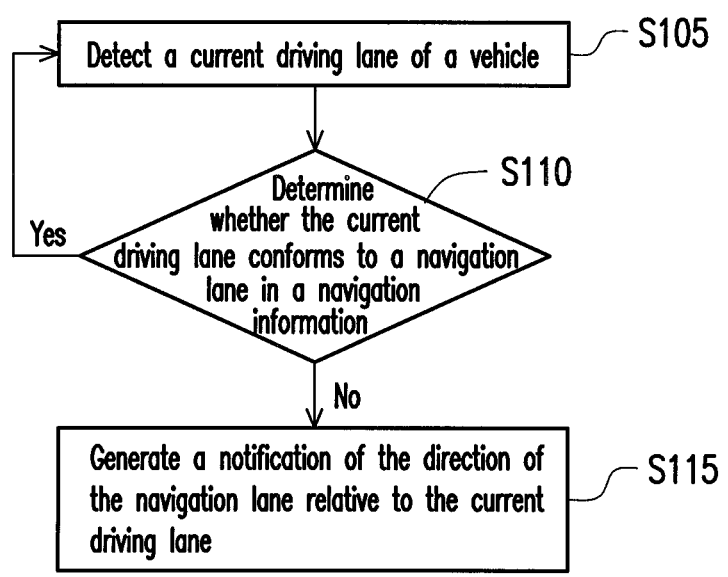
FIG. 1 is a flowchart of a vehicle navigation method according to a first example of the present application.

FIG. 1 is a flowchart of a vehicle navigation method according to the first example of the present application. Referring to FIG. 1, the vehicle navigation method in the present example is adaptable to an electronic device with a vehicle navigation system, wherein a lane detection technique is integrated with the vehicle navigation system to improve the navigation precision.

First, in step S105, a current driving lane of a vehicle is detected through the lane detection technique. The lane detection technique may be an image-based technique, wherein information such as the current driving lane, the lines of the lane, and the relation between the vehicle and the lane may be obtained through calculations performed on image data. For example, a lane info image is captured by using an image capturing unit (for example, a video camera), and the current driving lane is detected according to the lane info through the lane detection technique that is based on image recognition. In other examples, a sensor may also be adopted in the lane detection technique.

Then, in step S110, whether the current driving lane conforms to a navigation lane in navigation information is determined. Generally speaking, the navigation information may be obtained through navigation of the vehicle navigation system, and the navigation information contains the navigation lane in a pre-planned route. The vehicle may also be positioned through the global positioning system (GPS), a wireless communication base station, or a hot spot in a wireless network, so as to obtain the current position and driving direction of the vehicle and the information of nearby traffic.

For example, assuming that the planned path in the navigation information includes an access road, a ramp, or an exit, then the navigation lane should be an outside lane in order to allow the vehicle to reach the access road, ramp, or exit, and then whether the current driving lane of the vehicle is an outside lane is determined. Furthermore, if different lanes lead to different access roads or elevated roads, the vehicle can only reach the correct access road or elevated road by running in the correct lane, and then whether the current driving lane of the vehicle is the correct lane is determined. In addition, if the road splits ahead and different lanes lead to different branches, the vehicle can only reach the correct branch by running in the correct lane whether the current driving lane of the vehicle is the correct lane is determined.

Next, in step S115, if it is determined that the current driving lane does not conform to the navigation lane, a notification of the direction (for example, left or right) of the navigation lane relative to the current driving lane is generated. It should be noted that in order to allow the driver to determine the lane switching direction more intuitively, a visual indicator (for example, a turn arrow) may be pointed to the navigation lane. Besides, the visual indicator may also be displayed in the lane info image and pointed to the navigation lane so that the driver can get to know in which direction he or she drives towards more clearly. In addition, the current driving direction of the vehicle may also be displayed in the lane info image, and also integrated an augmented reality view.

It should be mentioned that in the present example, the navigation information also comprises drivable lane information recorded in road information (for example, a traffic regulation or a real-time road condition). Thus, in the present vehicle navigation method, whether the current driving lane conforms to the drivable lane recorded in the road information may also be determined. In another example, the navigation information may be referred to the road information (for example, the traffic regulation or the real-time road condition) only and no route planning is performed.

Generally, a lane open exclusively to some special vehicles (for example, a bus lane) and regular lanes are usually specified in a road, and regular vehicles can only run in the regular lanes. For example, the drive may be fined if a regular vehicle enters a bus lane accidentally. Thus, in the present example, whether the current driving lane conforms to a drivable lane is further determined according to the traffic regulation. For example, the traffic regulations of different places may be stored in a database established in the electronic device or obtained through the Internet, so that the drivable lanes in different road sections may be obtained through these traffic regulations.

In addition, the real-time road condition information of each road section may be obtained through a traffic message channel (TMC). The TMC provides areas, road sections, and directions currently affected by traffic accidents, roadworks, or other situations. Thus, undrivable lanes with on-going accidents or roadworks may be obtained through the TMC so that the vehicle can avoid such road sections.

Figure 2C:
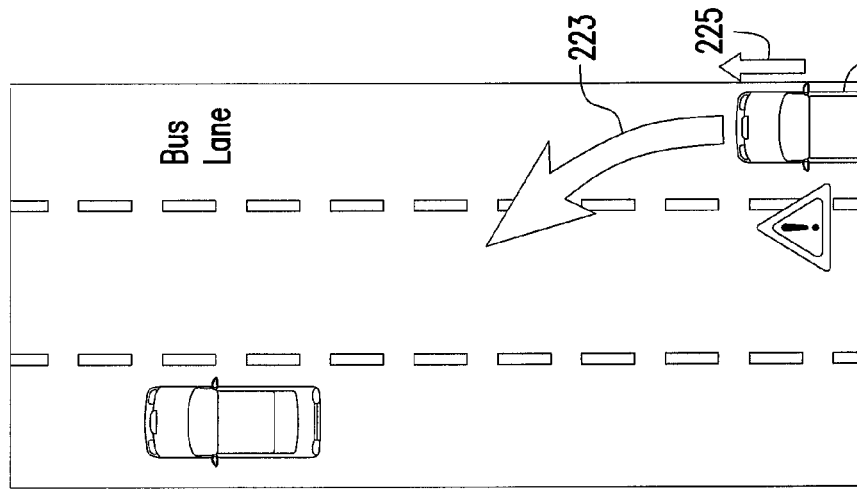
FIGS. 2A-2C illustrate lane info images according to the first example of the present application.
Figure 2B:
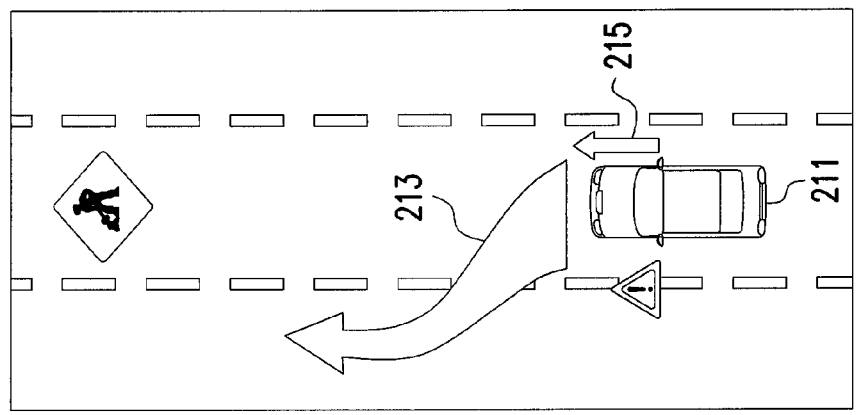
Figure 2A:
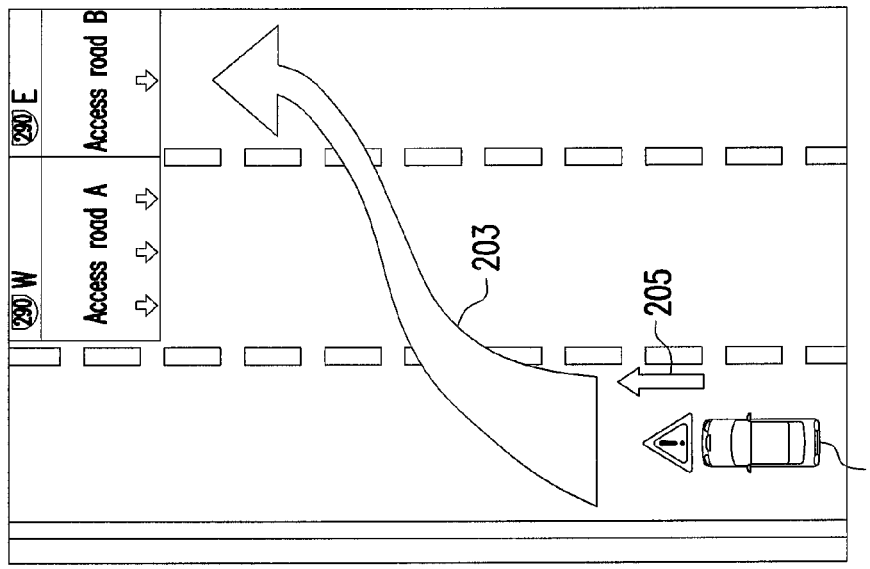

Below, the lane info image of that when the current driving lane does not conform to the navigation lane or the drivable lane will be described with an example. FIGS. 2A~2C illustrate the lane info images according to the first example of the present application. In FIG. 2A, whether the current driving lane conforms to the navigation lane is determined according to the navigation information, and in FIGS. 2B and 2C, whether the current driving lane conforms to the drivable lane is determined according to the road information.

Referring to FIG. 2A, it is assumed that one of the destinations in the planned route (i.e., the navigation information) of the vehicle 201 is an access road B and the navigation lane is an outside lane. Thus, the vehicle navigation system determines whether the current driving lane of the vehicle 201 is the outside lane. Because the current driving lane of the vehicle 201 is an inside lane, the vehicle navigation system displays a turn arrow 203 pointing to the outside lane in the lane info image. Besides, the current driving direction 205 of the vehicle 201 may also be displayed in the lane info image.

Referring to FIG. 2B, the vehicle 211 obtains a real-time road condition through the TMC and gets to know that a construction work is going on ahead in the central lane (i.e., the central lane is an undrivable lane). Accordingly, when the vehicle navigation system detects that the current driving lane is the central lane and gets to know that a construction work is going on ahead in the central lane according to the real-time road condition, the vehicle navigation system displays a turn arrow 213 pointing to another drivable lane in the lane info image. In the present example, the turn arrow 213 points to the inside lane, while in another example, the turn arrow 213 may also point to the outside lane. Herein a current driving direction 215 of the vehicle 211 is also displayed in the lane info image.

Referring to FIG. 2C, it is assumed that the outside lane is a bus lane. When the vehicle navigation system detects that the vehicle 221 is running in the outside lane and the outside lane is a bus lane according to the road information, the vehicle navigation system displays a turn arrow 223 pointing to a regular drivable lane in the lane info image. Besides, the current driving direction 225 of the vehicle 221 may also be displayed in the lane info image.

Additionally, in another example, whether the current driving lane conforms to the drivable lane may be further determined after the current driving lane is determined to conform to the navigation lane, or whether the current driving lane conforms to the navigation lane may be further determined after the current driving lane is determined to conform to the drivable lane. However, the present application is not limited thereto.

Thereby, the appropriate driving lane can be clearly shown to the driver according to the navigation information or the road information by detecting the current driving lane of the vehicle and displaying a visual indicator in the lane info image.

Second Example

Figure 3:
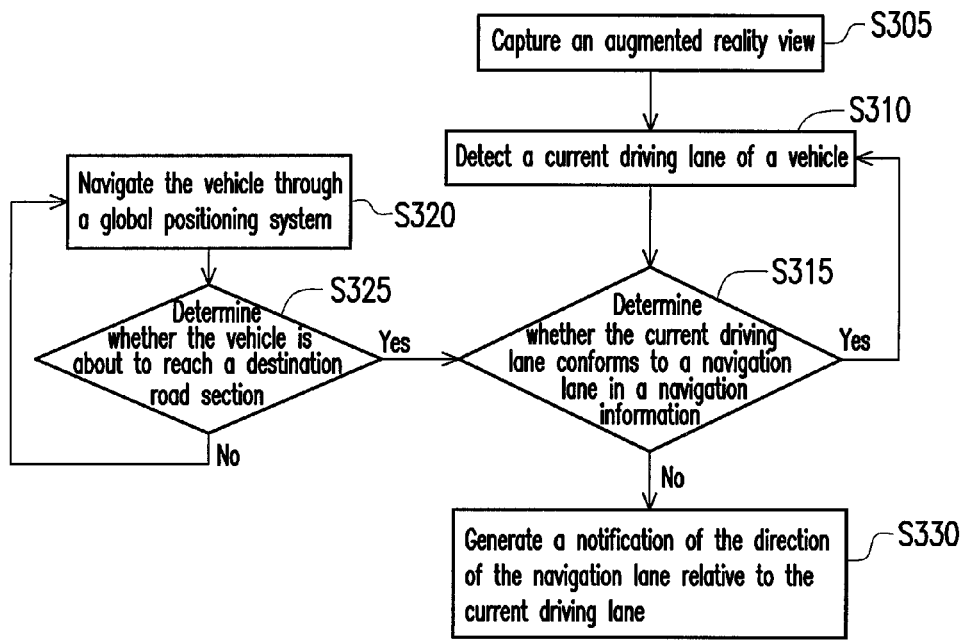
FIG. 3 is a flowchart of a vehicle navigation method according to a second example of the present application.

FIG. 3 is a flowchart of a vehicle navigation method according to the second example of the present application. Referring to FIG. 3, the vehicle navigation method in the present example is integrated with a lane detection technique that is based on image recognition and a GPS service.

In step S305, a photography function is started to capture an augmented reality view. Then, in step S310, a current driving lane of the vehicle is detected by using the augmented reality view. Next, in step S315, whether the current driving lane conforms to a navigation lane in the navigation information is determined. Steps S310 and S315 are similar to the steps S105 and S110 in the first example therefore will not be described herein.

After the vehicle navigation system is started, in step S320, the vehicle navigation system starts the GPS for navigation so as to obtain the navigation information. Then, in step S325, whether the vehicle is about to reach a destination road section is determined through the GPS. For example, a predetermined distance before a road split or a destination may be set as a destination road section. Whether the current driving lane of the vehicle conforms to the navigation lane is only determined (so as to notify the driver in advance) when the vehicle is detected reaching the destination road section.

If it is detected that the vehicle reaches the destination road section, in step S315, whether the current driving lane conforms to the navigation lane is determined. Taking the aforementioned access road as an example, whether the current driving lane is an outside lane is determined. As shown in FIG. 2A, the destination road section is assumed to be the road section of 500 meters from the access road B. The vehicle navigation system determines whether the current driving lane of the vehicle 201 is an outside lane only when it detects that the vehicle 201 reaches the road section of 500 meters before the access road B.

If the current driving lane conforms to the navigation lane, step S310 is executed again to detect the current driving lane of the vehicle 201. If the current driving lane does not conform to the navigation lane, in step S330, a notification of the direction (for example, left or right) of the navigation lane relative to the current driving lane is generated, so as to notify the driver to switch lanes. Step S330 is similar to step S115 in the first example therefore will not be described herein.

It should be mentioned that if the driver cannot switch to the navigation lane due to the current traffic situation, unlike the existing navigation system which starts to re-plan the route after it gets to know that the destination is missed through GPS positioning, the vehicle navigation system in the present example can instantly get to know that through the lane information and re-plan the route.

Third Example

Figure 4:
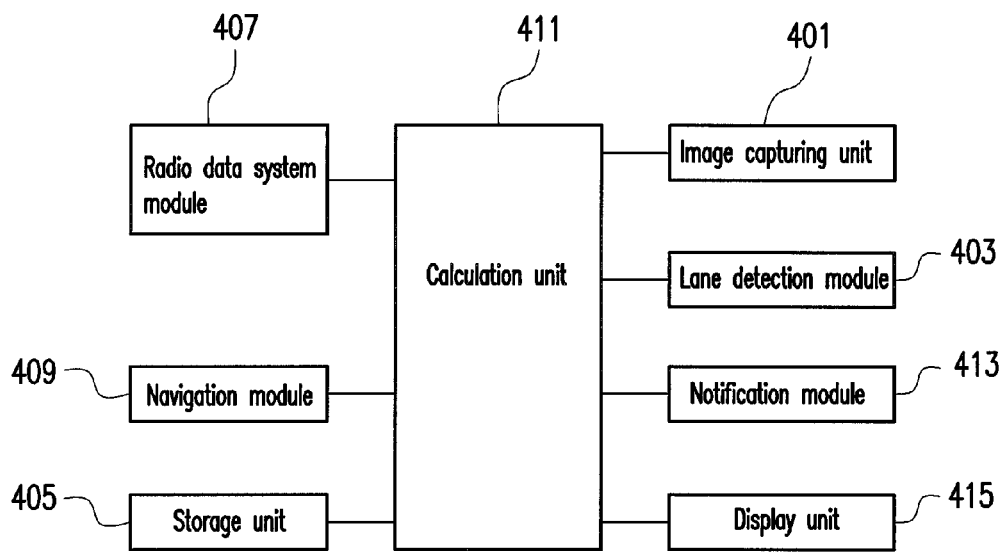
FIG. 4 is a block diagram of a vehicle navigation system according to a third example of the present application.

In the present example, a vehicle navigation system that executes the vehicle navigation method described above is provided. FIG. 4 is a block diagram of the vehicle navigation system according to the third example of the present application. In the present example, a lane detection technique based on image recognition is adopted. However, the lane detection technique is not limited herein, and in another example, a sensor may also be adopted for lane detection.

Referring to FIG. 4, the vehicle navigation system 400 may be disposed in an electronic device. The electronic device may be a handheld electronic device (for example, a mobile phone, a personal digital assistant (PDA), a PDA phone, a Car PC, a navigation device, a notebook, a music player, a digital camera, a video camera, or a game device) or an in-car electronic device. The vehicle navigation system 400 comprises a lane detection module 403, a storage unit 405, a navigation module 409, a calculation unit 411, a notification module 413, and a display unit 415.

The lane detection module 403 detects a current driving lane of a vehicle through a lane detection technique. For example, the vehicle navigation system 400 may comprise an image capturing unit 401, and the lane detection module 403 captures a lane info image by using the image capturing unit 401 (for example, a camera or a video camera) so that the lane detection module 403 can detect the current driving lane through the lane detection technique that is based on image recognition according to the lane info image.

The calculation unit 411 determines whether the current driving lane conforms to a navigation lane in navigation information. If the calculation unit 411 determines that the current driving lane does not conform to the navigation lane, it notifies the notification module 413 to generate a notification of the direction of the navigation lane relative to the current driving lane. For example, the notification module 413 may display a visual indicator pointing to the navigation lane. Besides, the notification module 413 may further display the current driving direction of the vehicle in the lane info image.

In addition, the navigation information also comprises drivable lane information recorded in road information (for example, a traffic regulation or a real-time road condition). Thus, the calculation unit 411 may further determine whether the current driving lane conforms to the drivable lane recorded in the road information so as to notify the notification module 413 to generate the direction of the drivable lane relative to the current driving lane when the current driving lane does not conform to the drivable lane. In an example, the navigation information may also be referred to the road information (for example, the traffic regulation or the real-time road condition) only and no route planning is performed.

In an example, the vehicle navigation system 400 may further comprise a radio data system module 407 for obtaining the real-time road condition through a TMC and storing the real-time road condition into the storage unit 405. The navigation module 409 navigates the vehicle through the navigation system so as to obtain a planned route as the navigation information and store the navigation information into the storage unit 405. Furthermore, the navigation module 409 may also serve the real-time road condition as the navigation information for distinguishing drivable and undrivable lanes. In addition, the navigation module 409 may also serve both the planned route and the real-time road condition as the navigation information. In an example, the navigation module 409 may further determine whether the vehicle reaches a destination road section through GPS so as to notify the calculation unit 411 to determine whether the current driving lane conforms to the navigation lane when the vehicle reaches the destination road section.

Accordingly, a driver can clearly understand the current position and driving direction through the vehicle navigation system 400.

The present application further provides a recording medium for executing the vehicle navigation method described above.

The recording medium is composed of a plurality of program instructions (for example, an organization chart establishing program instruction, a table approving program instruction, a setting program instruction, and a deployment program instruction, etc), and these program instructions are loaded into an electronic device and executed by the same to accomplish the steps in the vehicle navigation method and the functions of the vehicle navigation system described above.

As described above, in the present application, the information of a current driving lane of a vehicle is analyzed and captured through a lane detection technique, and a visual indicator is displayed in a lane info image through an augmented reality technique, so that the driver can clearly understand the current position and the driving direction and the precision in reality navigation can be greatly improved. In addition, in the present application, a navigation system, a real-time road condition, and the traffic regulations of different places are also adopted such that a driver can be notified to switch to the correct lane in advance.

It will be apparent to those skilled in the art that various modifications and variations can be made to the structure of the present application without departing from the scope or spirit of the application. In view of the foregoing, it is intended that the present application cover modifications and variations of this application provided they fall within the scope of the following claims and their equivalents.

What is claimed is:

1. A vehicle navigation method, adaptable to an electronic device, the vehicle navigation method comprising:
    detecting a current driving lane of a vehicle;
    determining whether the current driving lane conforms to a navigation lane in navigation information;
    generating a first notification of the direction of the navigation lane relative to the current driving lane if the current driving lane does not conform to the navigation lane;
    determining whether the current driving lane conforms to an undrivable lane recorded in road information, wherein the road information comprises a traffic regulation, and wherein the traffic regulation is stored in the electronic device or obtained through the Internet;
    generating a second notification of the direction of a drivable lane relative to the current driving lane if the current driving lane conforms to the undrivable lane; and
    re-planning a new navigation information when it is determined that the vehicle cannot be switched to the navigation lane from the undrivable lane.

2. The method according to claim 1, wherein the step of determining whether the current driving lane conforms to the navigation lane in the navigation information comprises:
    determining whether the current driving lane conforms to a drivable lane recorded in road information; and
    generating a notification of the direction of the drivable lane relative to the current driving lane if the current driving lane does not conform to the drivable lane.

3. The method according to claim 1, wherein the road information further comprises a real-time road condition.

4. The method according to claim 3, wherein the real-tune road condition is obtained through a traffic message channel (TMC).

5. The method according to claim 1, wherein before the step of determining whether the current driving lane conforms to the navigation lane, the method further comprises:
    positioning the vehicle through a positioning system to obtain a position of the vehicle;
    detecting whether the vehicle is about to reach a destination road section through the positioning system; and
    determining whether the current driving lane conforms to the navigation lane when the vehicle reaches the destination road section.

6. The method according to claim 1, wherein before the step of determining the current driving lane of the vehicle, the method further comprises:

capturing a lane info image; and
detecting the current driving lane according to the lane info image through a lane detection technique that is based on image recognition.

7. The method according to claim 6, wherein the step of generating the direction of the navigation lane relative to the current driving lane comprises:
displaying a visual indicator pointing to the navigation lane in the lane info image.

8. A non-transitory recording medium, recording program instructions for:
detecting a current driving lane of a vehicle;
determining whether the current driving lane conforms to a navigation lane in navigation information;
generating a first notification of the direction of the navigation lane relative to the current driving lane if the current driving lane does not conform to the navigation lane;
determining whether the current driving lane conforms to an undrivable lane recorded in road information, wherein the road information comprises a traffic regulation, and wherein the traffic regulation is stored in the electronic device or obtained through the Internet;
generating a second notification of the direction of a drivable lane relative to the current driving lane if the current driving lane conforms to the undrivable lane; and
re-planning a new navigation information when it is determined that the vehicle cannot be switched to the navigation lane from the undrivable lane.

9. A vehicle navigation system, comprising:
a lane detection module, for detecting a current driving lane of a vehicle;
a navigation module, for providing navigation information;
a calculation unit, for determining whether the current driving lane conforms to a navigation lane in the navigation information, and determining whether the current driving lane conforms to an undrivable lane recorded in road information, wherein the road information comprises a traffic regulation, and wherein the traffic regulation is stored in an electronic device or obtained through the Internet; and
a notification module, for generating a first notification of the direction of the navigation lane relative to the current driving lane if the calculation unit determines that the current driving lane does not conform to the navigation lane, and generating a second notification of the direction of a drivable lane relative to the current driving lane if the current driving lane conforms to the undrivable lane;
wherein, the navigation module re-plans a new navigation information when it is determined that the vehicle cannot be switched to the navigation lane from the undrivable lane.

10. The system according to claim 9, wherein the calculation unit further determines whether the current driving lane conforms to a drivable lane recorded in road information, and notifies the notification module to generate a notification of the direction of the drivable lane relative to the current driving lane if the current driving lane does not conform to the drivable lane.

11. The system according to claim 9, wherein the road information comprises a real-time road condition.

12. The system according to claim 9, further comprising:
a radio data system module, for obtaining the real-time road condition through a traffic message channel (TMC).

13. The system according to claim 9, wherein the navigation module further comprises a positioning system for positioning the vehicle.

14. The system according to claim 9, wherein the navigation module further determines whether the vehicle is about to reach a destination road section, and notifies the calculation unit to determine whether the current driving lane conforms to the navigation lane when the vehicle reaches the destination road section.

15. The system according to claim 9, further comprising:
an image capturing unit, for capturing a lane info image; and the lane detection module detects the current driving lane according to the lane info image through a lane detection technique that is based on image recognition.

16. The system according to claim 15, wherein the notification module further displays a visual indicator pointing to the navigation lane in the lane info image.

17. The system according to claim 15, wherein the notification module further displays a current driving direction of the vehicle in the lane info image.

18. The system according to claim 15, further comprising:
a display unit, for displaying the lane info image.

19. A vehicle navigation system, comprising:
a lane detection tool, for detecting a current driving lane of a vehicle;
a navigation tool, for providing navigation information;
a calculation tool, for determining whether the current driving lane conforms to a navigation lane in navigation information, and determining whether the current driving lane conforms to an undrivable lane recorded in road information, wherein the road information comprises a traffic regulation, and wherein the traffic regulation is stored in an electronic device or obtained through the Internet; and
a notification tool, for generating a first notification of the direction of the navigation lane relative to the current driving lane if the calculation unit determines that the current driving lane does not conform to the navigation lane, and generating a second notification of the direction of a drivable lane relative to the current driving lane if the current driving lane conforms to the undrivable lane;
wherein, the navigation tool re-plan a new navigation information when it is determined that the vehicle cannot be switched to the navigation lane from the undrivable lane.

* * * * *